(12) United States Patent
Dorfman

(10) Patent No.: US 7,032,457 B1
(45) Date of Patent: Apr. 25, 2006

(54) METHOD AND APPARATUS FOR DIELECTRIC SENSORS AND SMART SKIN FOR AIRCRAFT AND SPACE VEHICLES

(75) Inventor: Benjamin F. Dorfman, San Mateo, CA (US)

(73) Assignee: Nanodynamics, Inc., Buffalo, NY (US)

(\*) Notice: Subject to any disclaimer, the term of this patent is extended or adjusted under 35 U.S.C. 154(b) by 200 days.

(21) Appl. No.: 10/669,436

(22) Filed: Sep. 25, 2003

Related U.S. Application Data

(60) Provisional application No. 60/414,198, filed on Sep. 27, 2002.

(51) Int. Cl.
*G01B 11/16* (2006.01)
(52) U.S. Cl. .......................... 73/762; 73/769
(58) Field of Classification Search .......... 73/762–769
See application file for complete search history.

(56) References Cited

U.S. PATENT DOCUMENTS

| | | | |
|---|---|---|---|
| 5,352,493 A | 10/1994 | Dorfman et al. | |
| 5,466,431 A | 11/1995 | Dorfman et al. | |
| 5,718,976 A | 2/1998 | Dorfman et al. | |
| 5,726,524 A * | 3/1998 | Debe | 313/309 |
| 5,797,623 A | 8/1998 | Hubbard | |
| 6,071,597 A * | 6/2000 | Yang et al. | 428/209 |
| 6,080,470 A | 6/2000 | Dorfman | |
| 6,268,161 B1 * | 7/2001 | Han et al. | 435/14 |
| 6,469,390 B1 * | 10/2002 | Chang et al. | 257/758 |
| 6,835,523 B1 * | 12/2004 | Yamazaki et al. | 430/269 |
| 2003/0129497 A1 * | 7/2003 | Yamamoto et al. | 429/246 |

\* cited by examiner

*Primary Examiner*—Max Noori
*Assistant Examiner*—Alandra Ellington
(74) *Attorney, Agent, or Firm*—Brown Raysman Millstein Felder & Steiner LLP

(57) ABSTRACT

A new family of multifunctional smart coatings based on diamond-like atomic-scale composite materials which can provide a real-time control of the surface stress distribution and potentially dangerous stress diagnostic for the most critical parts of flying vehicles. The coating is a silica-stabilized dielectric film, particularly, a diamond-like atomic-scale composite material.

10 Claims, 4 Drawing Sheets

Cross-section

US 7,032,457 B1

METHOD AND APPARATUS FOR DIELECTRIC SENSORS AND SMART SKIN FOR AIRCRAFT AND SPACE VEHICLES

This application claims priority on U.S. Provisional Application Ser. No. 60/414,198 filed on Sep. 27, 2002 entitled: METHOD AND APPARATUS FOR DIELECTRIC SENSORS AND SMART SKIN FOR AIRCRAFT AND SPACE VEHICLES.

BACKGROUND OF THE INVENTION

1. Field of the Invention

Sensors for critical stress diagnostic in real time and smart skin especially for aircraft and space vehicles.

2. Description of the Related Art

U.S. Pat. No. 5,797,623 (Hubbard, Aug. 25, 1998) discloses the Smart skin sensor for real time side impact detection. However, no patents or applications are known for sensor or smart skin based on the proposed physical phenomena.

SUMMARY OF THE INVENTION

A new family of multifunctional smart coatings based on diamond-like atomic-scale composite (DL ASC) materials developed over the past decade. The coatings will provide a real-time control of the surface stress distribution and potentially dangerous stress diagnostic for the most critical parts of flying vehicles.

BRIEF DESCRIPTION OF THE DRAWINGS

FIG. 3,b shows array on dielectric substrate:

FIG. 3,c shows the array with lateral electrodes:

DETAILED DESCRIPTION OF THE PREFERRED EMBODIMENT(S)

Figure 1:
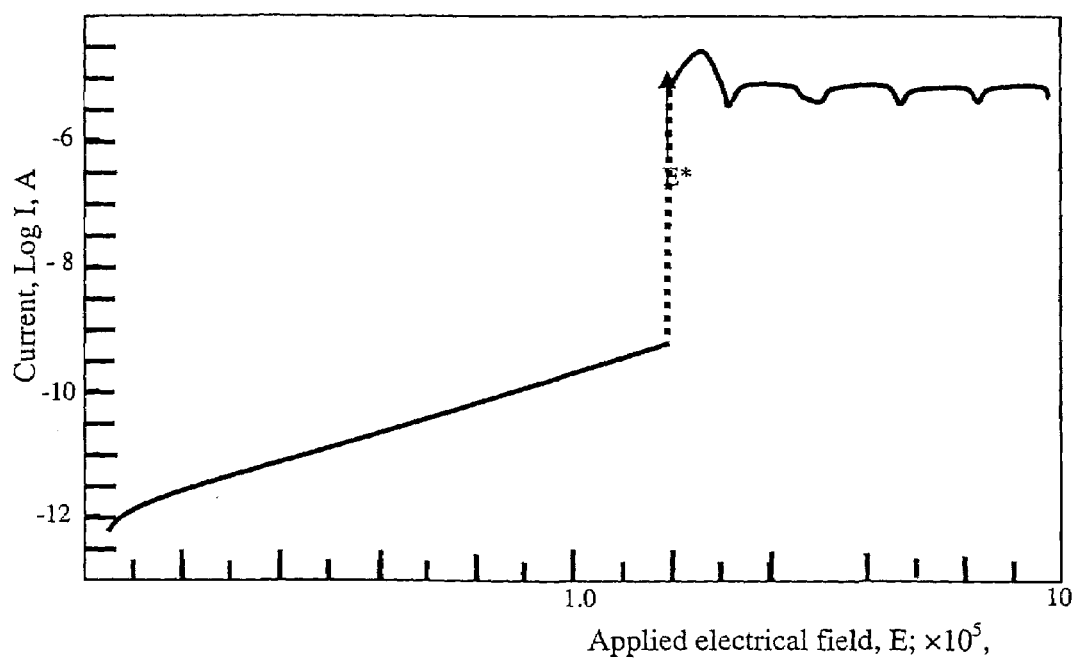
FIG. 1 (Prior Art) shows typical dependence of current (Log I, A) through stabilized diamond-like dielectric vs. Applied electrical field, V/cm.

FIG. 1 (Prior Art) shows typical dependence of current (Log I, A) through stabilized diamond-like dielectric vs. Applied electrical field, V/cm. The sharp transition in four orders of magnitude of electrical resistivity from about $10^{13}$ Om.cm to about $10^9$ Om.cm occurred at $2\times10^5$ V/cm. The plot was received using 1-micrometer thick stabilized diamond-like dielectric film deposited upon conducting substrate; the area of the top electrode 0.1 cm$^2$.

Joint electron-structural phase transition (the static Jan-Teller effect) occurs in diamond-like stabilized carbon at critical electrical field. When electrical field exceeds some certain critical point, typically $E^*=2\times10^5$ V/cm, the local fine structure of diamond-like matrix suddenly changes. The mean distance between nucleus of carbon atoms in certain atomic groups decreases, and electronic structure of those groups changes as well, adjusting to a new atomic arrangement. Such a joint electron-structural phase transition results with a sharp jump-like reversible increase of electrical conductivity of diamond-like dielectric on 3 to 4 orders of magnitude (FIG. 1). Typically, electrical resistivity decreases from the initial value of $10^{11}$ or $10^{13}$ Om.cm to a higher conductance state of $10^8$–$10^9$ Om.cm. In the high-conducting state the current virtually does not depend on electrical field, although slightly fluctuates. When the electrical field E decreased below critical value E*, diamond-like dielectric instantly returns to the initial state. It is important to point, that in spite of this conductivity jump, diamond-like carbon remains as dielectric solid up to essentially higher field about $5\times10^6$ V/cm to $2\times10^7$ V/cm.

This physical phenomena was previously known as "the static Jan-Teller effect" by the names of two physicists who theoretically predicted it (H. Jahn and E. Teller, 1937). Although static Jan-Teller effect is found in many crystals, usually it observed by certain particularities of optical spectra, ultrasonic waves propagation, or electronic paramagnetic resonance. Strong and sharp change of electrical conductivity first observed in diamond-like carbon is unusual or even unique phenomena, and it is due to specific combination of electronic and mechanical properties of this low-density diamond-like carbon structures.

Figure 2A:
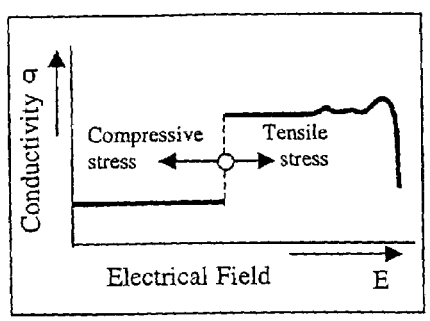
FIGS. 2a, b, and c shows shift of critical electrical field under stress: compressive stress shifts the threshold to the lower values of applied fields, while tensile stress shifts this threshold in the direction of higher fields.
Figure 2B:
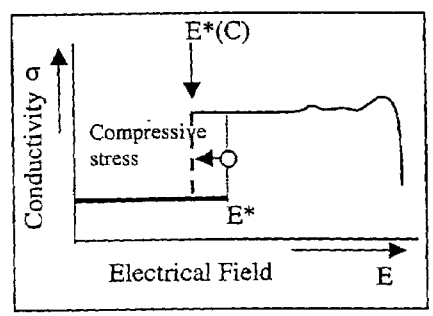
Figure 2C:
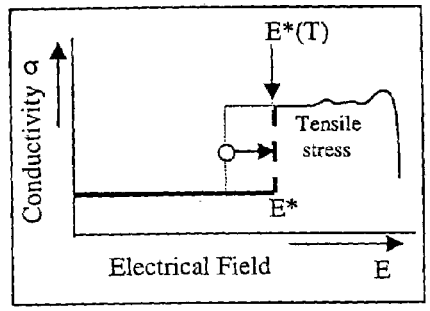

FIG. 2 shows shift of critical electrical field under stress: compressive stress shifts the threshold to the lower values of applied fields, while tensile stress shifts this threshold in the direction of higher fields.

Under external pressure or stretching force, or under internal compressive or tensile stress, the critical field is slightly changes (FIG. 2). Although the change of critical field is only about 0.1E*IGPa, if some pre-critical field E<E* applied to diamond-like dielectric, the sharp increase of electrical conductivity in a few orders of magnitude would instantly occur if compressive stress exceeds some critical value. Inversely, if some post-critical field E>E* applied to diamond-like dielectric, the sharp change of electrical conductivity in a few orders of magnitude would instantly occur if the tensile stress exceeds some critical value.

Figure 3:
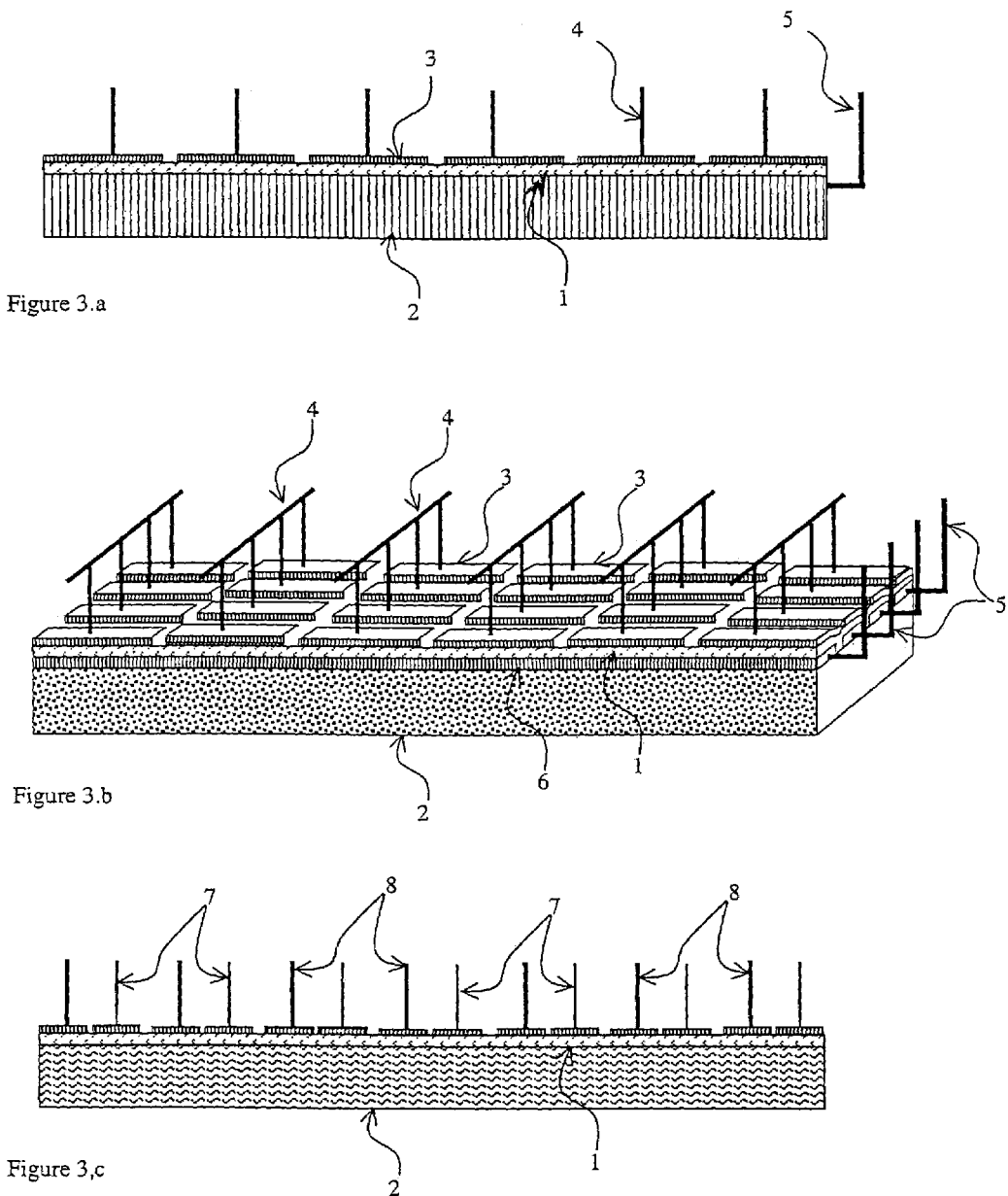
FIG. 3,a shows array on electrically conducting substrate.

In accordance with present invention, silica-stabilized dielectric film is used as sensitive material for detection and diagnostics of dangerous stress and its location in structures, such as aircraft. This sensitive material may be used in individual sensors, and as a basic sensitive material for sensor arrays for smart skin technology (FIG. 3a,b,c).

FIGS. 3a–c shows 3 different approaches for electrical connection of diamond-like dielectric sensors into array:

FIG. 3a shows array on electrically conducting substrate: 1—diamondlike dielectric layer (sensitive material), 2—conducting substrate, 3, 4—top electrodes and connecting lines, 5—bus to substrate.

FIG. 3b shows array on dielectric substrate: 1-diamond-like electric layer (sensitive material), 2-dielectric substrate, 3-top electrodes and connecting lines, 4, 5-address buses, 6-electrically conducting sub-layer.

FIG. 3c shows the array with lateral electrodes: 1—diamondlike dielectric layer (sensitive material), 2—substrate (dielectric or conductor), 7, 8—lateral electrodes.

Typically, the electrical field is applied cross the sensitive film thickness, and said thickness is typically in the range from a few hundred nanometers to a few micrometers. Depending on electrical properties of diagnosing surface, the different array geometry and connection between individual sensors may be applied, as it shown on FIGS. 3a and 3b. Also, lateral arrangement of the electrodes may be used (FIG. 3c). In the last case the distance between two electrodes of a sensor should not exceed the film thickness. The last technology is relatively expensive and can be used for precise control of certain critical elements of the structure or during testing supporting new design.

It can sense stress space distribution along the entire surface of the structure, such as internal and/or external surface of the aircraft wing, in real time i.e., fractions of a millisecond. The sensors may be deposited directly upon the wing surface. The electrodes may be deposited after the sensitive material layer using the same technology and equipment while introducing metals in diamond-like carbon matrix. Both dielectric and conducting materials possess exceptionally high adhesion, abrasion and chemical resistance, excellent smoothness and tribological properties, thus simultaneously providing protection and improving aerodynamic properties of the wings.

The sensors is simple to manufacture and deposit along the entire structure.

For "smart skin" application, the advantage of Jan-Teller transition is completely dielectric state of sensitive smart film: it allows using a continuous "smart skin" sensitive in any point where a dangerous stress occurred (FIG. 1). Indeed, the most critical for the structure integrity is the tensile strength, while it would be easier to detect a compressive stress spot. This is because a compressive stress would produce the current increase in 2 to 4 orders of magnitude or higher, and a spot occupying about 0.01 of the entire area under electrode would be easily detected. However, any local increase of tensile stress in the integral structural body is accompanied with the compressive stress that will be detected. Thus, it would especially effective to integrate in smart skin both kinds of sensors: under pre-transition electrical field diagnosing compressive stress, and under post-transition electrical field diagnosing tensile critical stress. The intelligent electronic system would calculate the entire map of stress and location of a tensile stress spot in proximity of the initially detected compressed one.

Furthermore, the absolute value of the applied electrical voltage may be controllably varied through the sensor array, and the stress measurements, both compressive and tensile may be scanned along the entire smart skin in a reasonable proximity of critical value.

The coated body may be conductive or insulating. In the last case, a conducting sub-layer as a ground electrode (FIG. 3b) should be deposited first, preferably the Me-C ASC deposited on the first step of the same continuous process. Top electrodes should be distributed over the sensitive dielectric layer and connected with the detector array, for instance along the trailing edge of aircraft wing. The network of top electrodes and connecting lines may be also deposited using Me-ASC. Finally, the whole parts of the vehicle, such as the wings, would be coated with a thin dielectric ASC to protect the sensitive smart skin and provide a uniform weather-resistant and aerodynamically sound coating for those parts.

Figures 4, 5:
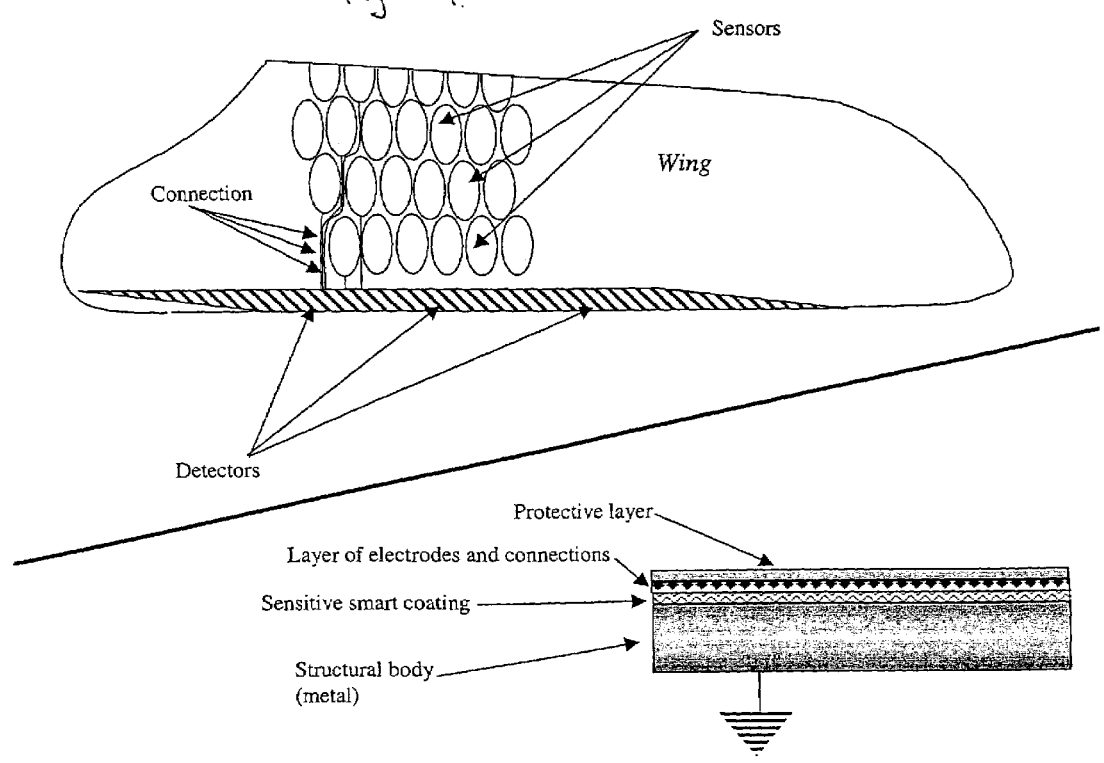
FIG. 4 shows one of possible geometry of the ray forming a smart skin for aircraft wing.
FIG. 5 shows a cross sectional view of the protective top layer, the conductive electrode layer, the smart skin dielectric layer, and the metal substrate.

FIG. 4 shows one of possible geometry of the array forming a smart skin for aircraft wing.

FIG. 5 shows a cross sectional view of the protective top layer, the conductive electrode layer, the smart skin dielectric layer, and the metal substrate.

A process for depositing the coating system may be shown in the following example:

1. The electrically conducting subject (FIG. 3a, c) to be coated with smart skin, such as the aircraft wing (as shown on FIG. 4,5), is cleaned with a standard techniques of the vacuum industry.

2. The subject to be coated with smart skin is located in vacuum deposition chamber.

3. Air is pumped out of said deposition chamber up to about $1.0 \times 10^{-5}$ Torr.

4. The chamber is filled with argon up to pressure of about $5 \times 10^{-5}$ Torr, and the surface to be coated cleaned in the argon low pressure discharge during about 10 minutes.

5. Unalloyed stabilized diamond-like carbon 0.5 micrometer thick dielectric layer is deposited upon the surface of the structure (FIG. 3 a, c), such as the aircraft wing using a know techniques (such as those discussed in U.S. Pat. Nos. 5,355,2493, 5,718,976; and 6,080,470, each of which are hereby incorporated herein by reference). Said unalloyed stabilized diamond-like carbon dielectric layer possesses resistivity in an order of $10^{13}$ ohm.cm.

6. Chromium-alloyed diamond-like Me-C 1-micrometer thick conducting layer (as it shown in cross-section on FIG. 5) deposited upon said unalloyed stabilized diamond-like carbon dielectric layer; said chromium-alloyed diamond-like Me-C conducting layer possesses resistivity of about $10^{-4}$ Om.cm. Deposition of said unalloyed stabilized diamond-like carbon dielectric layer and said chromium-alloyed diamond-like Me-C conducting layer proceeded in the same vacuum chamber at the working pressure of about $10^{-5}$ Torr in one two-step continuous deposition process.

7. The chamber is filled with air up to atmospheric pressure and opened, the subject removed from chamber.

8. The patterning of electrodes and conducting lines (FIG. 3 a, 3, 4) realized with laser, such as $CO_2$ laser, with a known technique.

9. The operations 2,3,4,5 repeated, and top dielectric layer deposited as a final protective layer of smart skin.

10. Operation 7 repeated.

11. The conducting lines connected with electronic control systems using standard technique known from the prior art.

The present invention, therefore, is well adopted to carry out the objects and attain the ends and advantages mentioned. While preferred embodiments of the present invention have been described for the purpose of disclosure, numerous other changes in the details of the material structure, composition, graded functionality and device designs can be carried out without departing from the spirit of the present invention which is intended to be limited only by the scope of the appended claims.

What is claimed is:

1. A stress sensor comprising:
   a first electrode;
   at least one other electrode; and
   a dielectric layer disposed in relation to the first and the at least one other electrode for the electrodes to supply an electric field (E) to the dielectric layer, wherein the dielectric layer comprises a diamond-like carbon film that exhibits a change in conductivity when exposed to an electric field (E) at a level above a critical electric field (E*), wherein the critical electric field (E*) of the diamond-like film shifts under an applied stress, and wherein the critical electric field (E*) comprises about $2 \times 10^5$ V/cm.

2. A stress sensor comprising:
   a first electrode;
   at least one other electrode; and
   a dielectric layer disposed in relation to the first and the at least one other electrode for the electrodes to supply an electric field (E) to the dielectric layer, wherein the dielectric layer comprises a diamond-like carbon film that exhibits a change in conductivity when exposed to an electric field (E) at a level above a critical electric field (E*), wherein the critical electric field (E*) of the diamond-like film shifts under an applied stress, and wherein compressive forces on the diamond-like carbon film lowers the value of the critical electric field (E*) and wherein tensile forces on the diamond-like carbon film increases the value of the critical electric field (E*).

3. A stress sensor comprising:
a first electrode;
at least one other electrode; and
a dielectric layer disposed in relation to the first and the at least one other electrode for the electrodes to supply an electric field (E) to the dielectric layer, wherein the dielectric layer comprises a diamond-like carbon film that exhibits a change in conductivity when exposed to an electric field (E) at a level above a critical electric field (E*), wherein the critical electric field (E*) of the diamond-like film shifts under an applied stress, and wherein the diamond-like carbon film has a thickness and the electrodes are disposed laterally with respect to each other a distance no greater than the thickness of the diamond-like carbon film.

4. A stress sensor comprising:
a first electrode;
a plurality of other electrodes; and
a dielectric layer disposed in relation to the first and the at least one other electrode for the electrodes to supply an electric field (E) to the dielectric layer, wherein the dielectric layer comprises a diamond-like carbon film that exhibits a change in conductivity when exposed to an electric field (E) at a level above a critical electric field (E*), wherein the critical electric field (E*) of the diamond-like film shifts under an applied stress, and wherein the diamond-like carbon film is deposited onto a surface of a structure being measured for stress as a continuous layer to serve as a sensing layer for the plurality of the other electrodes.

5. A method for determining whether a particular level of stress has been applied to a structure using a stress sensor comprising:
a first electrode;
at least one other electrode; and
a dielectric layer disposed in relation to the first and the at least one other electrode for the electrodes to supply an electric field (E) to the dielectric layer, wherein the dielectric layer comprises a diamond-like carbon film that exhibits a change in conductivity when exposed to an electric field (E) at a level above a critical electric field (E*), wherein the critical electric field (E*) of the diamond-like film shifts under an applied stress,
the method comprising:
applying an electric field (E) with the first electrode and the at least one other electrode to the dielectric layer;
monitoring the conductivity of the dielectric layer; and
determining whether the particular level of stress has been applied to the structure based on a change in the conductivity of the dielectric layer.

6. The method of claim 5, comprising determining whether the particular level of stress has been applied based on a shift in the critical electric field (E*) of the dielectric layer resulting from the applied stress.

7. The method of claim 6, comprising applying an electric field (E) at a level less than the critical electric field (E*) and determining whether a particular compressive stress has been applied to the structure based on a change in the conductivity of the dielectric layer which results from a shift in the critical electric field (E*) of the dielectric layer as a result of the compressive stress.

8. The method of claim 7, comprising determining whether a particular compressive stress has been applied to the structure based on a change in conductivity of the dielectric layer which results from a shift in the critical electric field (E*) of the dielectric layer to that less than the electric field (E) applied.

9. The method of claim 6, comprising applying an electric field (E) at a level greater than the critical electric field (E*) and determining whether a particular tensile stress has been applied to the structure based on a change in the conductivity of the dielectric layer which results from a shift in the critical electric field (E*) of the dielectric layer as a result of the tensile stress.

10. The method of claim 9, comprising determining whether a particular tensile stress has been applied to the structure based on a change in conductivity of the dielectric layer which results from a shift in the critical electric field (E*) of the dielectric layer to that greater than the electric field (E) applied.

* * * * *